(12) United States Patent
Dietz et al.

(10) Patent No.: US 7,070,850 B2
(45) Date of Patent: Jul. 4, 2006

(54) DRAG REDUCTION ARTICLE AND METHOD OF USE

(75) Inventors: Timothy M. Dietz, Mendota Heights, MN (US); Daniel R. Fronek, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 140 days.

(21) Appl. No.: 10/335,496

(22) Filed: Dec. 31, 2002

(65) Prior Publication Data

US 2004/0126541 A1 Jul. 1, 2004

(51) Int. Cl.
- B32B 3/00 (2006.01)
- B64C 1/38 (2006.01)

(52) U.S. Cl. ............ 428/172; 428/167; 244/130; 244/200

(58) Field of Classification Search ............ 428/156, 428/167, 172; 244/130, 198, 199, 200
See application file for complete search history.

(56) References Cited

U.S. PATENT DOCUMENTS

| | | |
|---|---|---|
| 3,018,262 A | 1/1962 | Schroeder |
| 3,117,099 A | 1/1964 | Proops et al. |
| 4,329,384 A | 5/1982 | Vesley et al. |
| 4,330,590 A | 5/1982 | Vesley |
| 4,379,201 A | 4/1983 | Heilmann et al. |
| 4,418,120 A | 11/1983 | Kealy et al. |
| 4,503,211 A | 3/1985 | Robins |
| 4,576,850 A | 3/1986 | Martens |
| 4,684,678 A | 8/1987 | Schultz et al. |
| 4,707,534 A | 11/1987 | Schultz |
| 4,737,559 A | 4/1988 | Kellen et al. |
| 4,777,084 A | 10/1988 | Marteness |
| 4,986,496 A | 1/1991 | Marentic et al. |
| 5,069,403 A | 12/1991 | Marentic et al. |
| 5,073,611 A | 12/1991 | Rehmer et al. |
| 5,133,516 A | 7/1992 | Marentic et al. |
| 5,183,597 A | 2/1993 | Lu |
| 5,276,106 A | 1/1994 | Portelli et al. |
| 5,369,192 A | 11/1994 | Ko et al. |
| 5,424,122 A | 6/1995 | Crandall et al. |
| 5,468,540 A | 11/1995 | Lu |
| 5,506,279 A | 4/1996 | Babu et al. |
| 5,604,034 A | 2/1997 | Matsuda |

(Continued)

FOREIGN PATENT DOCUMENTS

DE 101 50 247 A1 4/2003

(Continued)

OTHER PUBLICATIONS

Souheng Wu, "Modifications of Polymer Surfaces: Mechanisms of Wettability and Bondability Improvements", *Polymer Interface and Adhesion*, Ed., Marcel Dekker, Inc., NY and Basel, pp. 279-336 (1982).

(Continued)

*Primary Examiner*—Donald J. Loney

(57) ABSTRACT

An article for reducing the drag caused by a fluid flowing over a surface comprises a backing layer having an outer, exposed patterned surface that reduces drag, and an adhesive bonding layer for bonding the backing layer to the surface of a substrate, the article being free of a reinforcing layer.

6 Claims, 2 Drawing Sheets

U.S. PATENT DOCUMENTS

| | | | |
|---|---|---|---|
| 5,728,755 A | | 3/1998 | Weigel et al. |
| 5,848,769 A | | 12/1998 | Fronek et al. |
| 5,972,176 A | | 10/1999 | Kirk et al. |
| 5,976,671 A | * | 11/1999 | Gleim ..................... 428/172 |
| 6,054,221 A | | 4/2000 | Weigel et al. |
| 6,475,616 B1 | | 11/2002 | Dietz et al. |
| 2002/0179240 A1 | * | 12/2002 | Clemens et al. ......... 156/307.1 |

FOREIGN PATENT DOCUMENTS

| WO | WO 02/070623 A2 | 9/2002 |
|---|---|---|

OTHER PUBLICATIONS

"Surface Modification", *Encyclopedia of Polymer Science and Engineering*, Second Edition, Supplemental Volume, John Wiley & Sons, pp. 674-689 (1989).

"Techniques for Identification and Characterization", Handbook of Pressure Sensitive Adhesive Technology, Second Edition, D. Satas, ed., Van Nostrand Reinhold, New York, NY, pp. 171-176 (1989).

* cited by examiner

DRAG REDUCTION ARTICLE AND METHOD OF USE

BACKGROUND

This invention relates to articles that can be applied to surfaces to reduce the drag caused by fluids (e.g., air, gas, water, etc.) flowing across such surfaces.

It is desirable to reduce the drag caused by bodies passing through fluid media, such as an airplane moving through air, a boat moving through water, or a motor vehicle moving through air. Relatively small reductions in drag can significantly reduce the fuel needed to propel the body. Improved fuel economy can result.

To enhance their utility, drag reduction articles should possess certain properties. For example, they should be weatherable. That is, the drag reduction articles should not deteriorate or lose performance as a result of exposure to ultraviolet radiation, wind, sand, rain, snow, ice, repeated and substantial changes in temperature, etc. Further, the drag reduction article should adhere well to the exterior of the vehicle to which it is applied, e.g., an aircraft, and should have resistance to fluids to which it might be exposed to, e.g., organic solvents. A certain degree of conformability is also desired to facilitate application to flat surfaces or smooth contoured ones, i.e., those essentially free of surface protrusions, such as raised rivets. For some applications, the drag reduction article should remove cleanly and easily from a surface to which it has been applied. Finally, it is desirable that the drag reduction article be easily produced, for example, by minimizing the number of layers in its construction. By minimizing the number of layers required for a drag reduction article, its cost of manufacture can also be decreased.

Various drag reduction articles are known and comprise a thermoplastic or thermoset polymeric film having a patterned surface that reduces drag. Examples of these articles can be found in U.S. Pat. Nos. 4,986,496; 5,069,403; and 5,133,516, each to Marentic et al. The articles of Marentic et al. usefully reduce drag. Another example of drag reduction articles can be found in U.S. Pat. No. 5,848,769 to Fronek et al. The articles of Fronek et al. improve upon those of Marentic et al. by providing improved handling, removability, and weathering characteristics while usefully reducing drag.

SUMMARY

In general, this invention relates to articles that can be applied to surfaces to reduce the drag caused by fluids (e.g., air, gas, water, etc.) flowing across such surfaces. More specifically, and in one embodiment, this invention pertains to a drag reduction article that comprises an outer layer having an exposed, patterned surface that reduces the drag caused by a fluid flowing over the surface; an adhesive bonding layer for attachment of the article to such surfaces; and an optional intermediate layer between the outer layer and the adhesive bonding layer. Such articles are free of a reinforcing layer.

In one aspect, the outer layer comprises a blend of a polymer having good bonding properties and a polymer having good chemical and weather resistance properties so as to render the drag reduction article suitable for use in aerospace applications. The polymer having good bonding properties is typically an acrylic polymer, and suitable acrylic polymers comprise the polymerization product of a monomer selected from the group consisting of methyl methacrylate, ethyl methacrylate, butyl methacrylate, and combinations thereof. The polymer having good chemical and weather resistance properties is typically a fluoropolymer, suitably one that includes (1) polymerized units of vinylidene fluoride; (2) copolymers derived from polymerized units of vinylidene fluoride and a monomer selected from the group consisting of ethylene, hexafluoropropylene, tetrafluoroethylene, and combinations thereof; and (3) combinations of (1) and (2). In one embodiment, the intermediate layer also comprises a blend of a fluoropolymer and an acrylic polymer, and those which are useful may be selected from among those used to provide the outer, patterned layer. Typically, the intermediate layer employs a higher weight percentage of the acrylic polymer so as to promote good adhesion between the adhesive bonding layer and the outer, patterned layer.

In addition, the drag reduction article also includes an adhesive bonding layer (e.g., a pressure-sensitive adhesive, a curable adhesive, or an uncured composite article) for bonding the drag reduction article to a surface or a substrate.

The exposed, patterned surface in the outer layer generally comprises a series of essentially parallel peaks separated by a series of essentially parallel valleys, although a variety of wave forms within this description are possible so long as they reduce the drag caused by a fluid flowing over the surface to which the drag reduction article has been attached.

In another embodiment, the invention relates to a method of reducing the drag caused by a fluid flowing over a surface. The method comprises the steps of:

(a) providing a surface over which a fluid may flow;

(b) providing an article capable of reducing the drag created by the fluid flowing over the surface provided in step (a); and (c) attaching the article from step (b) to the surface provided in step (a) so as to reduce the drag created by the fluid flowing over that surface.

Any of the previously described drag reduction articles may be used in step (b).

BRIEF DESCRIPTION OF THE DRAWINGS

The invention will be more fully appreciated by referring to the following drawings in which similar reference numerals designate like or analogous components and in which.

DETAILED DESCRIPTION

Figure 1:
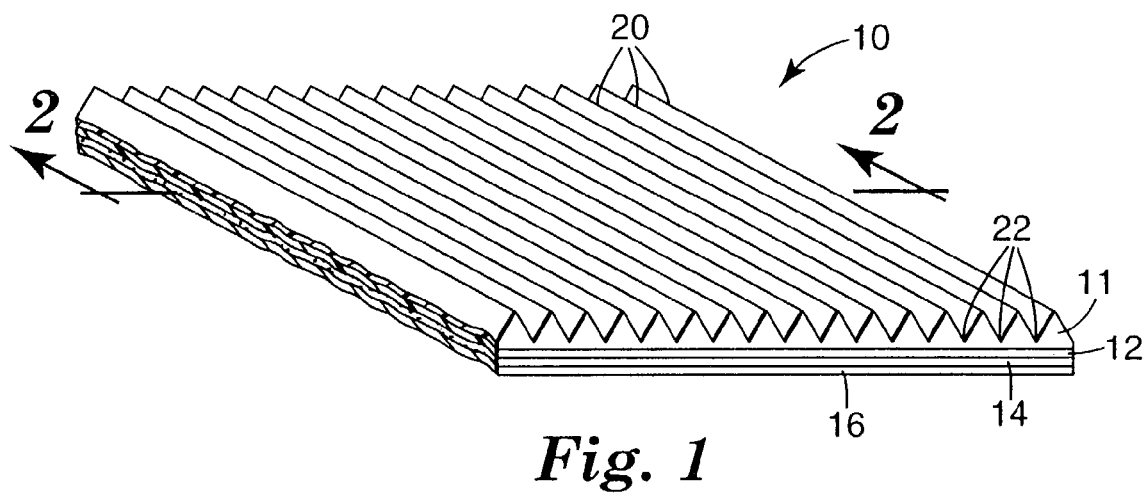
FIG. 1 is a fragmentary perspective view of one embodiment of a drag reduction article according to the invention.
Figure 2:
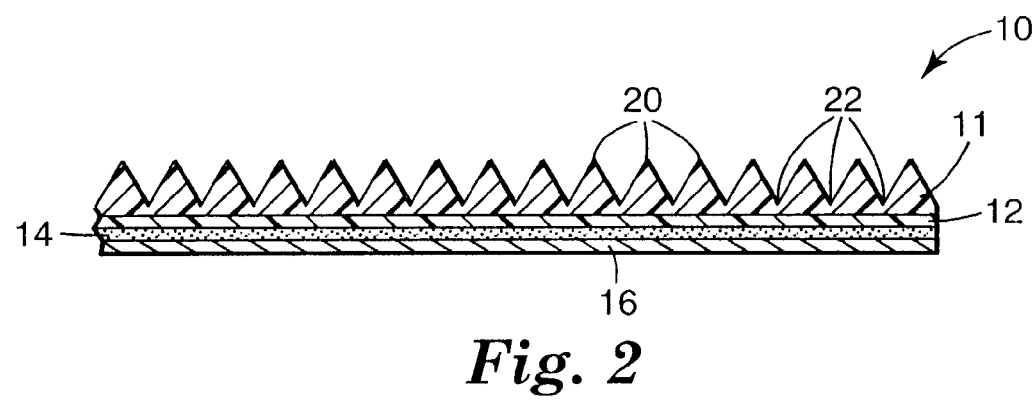
FIG. 2 is a sectional view taken along lines 2—2 in FIG. 1.

Turning now to the drawings, FIGS. 1 and 2 illustrate a drag reduction article 10 according to the invention and which may be opaque, translucent, or transparent. Drag reduction article 10 comprises an outer patterned backing layer 11 with an outer patterned surface having peaks 20 and valleys 22, an optional intermediate layer 12, an adhesive bonding layer 14, and an optional temporary, removable, protective liner 16. The terms "outer patterned" and "outer exposed pattern" are used interchangeably herein.

Such articles are useful on vehicles, such as planes, trains, automobiles, boats, and ships, as well as other surfaces over which a fluid may flow, such as windmill rotor blades or the interior surface of a fluid-conveying conduit. They can be used on painted, primed (for example, epoxy primer, chromated primer), or bare surfaces. They can be used on metal surfaces, particularly aluminum surfaces, which can be an anodized surface, a chromate-treated surface (which results from treatment with Alodine 1200, available from Amchem Products, Inc., Abmoler, Pa.), or otherwise treated surface. They can be used on surfaces of composite materials, such as carbon fiber reinforced plastics, for example.

In one embodiment, drag reduction article 10 comprises a backing layer 11 with an outer exposed patterned surface, an adhesive bonding layer 14, and an optional temporary, removable protective liner 16 and is free of a reinforcing layer, such as that described in U.S. Pat. No. 5,848,769. Such materials are said to include thermoplastic polyurethanes and polyvinyl chloride. It has been found that sufficiently conformable drag reduction articles may be provided without employing such a layer. As a result, it is expected the present invention will exhibit an improved ease of manufacture and a decreased cost of production. It is also anticipated that the present invention will exhibit improved chemical fluid resistance.

In an alternative embodiment, the drag reduction article consists essentially of outer patterned backing 11, an adhesive bonding layer 14, and an optional temporary, removable protective liner.

In another embodiment, drag reduction article comprises outer patterned backing layer 11, an adhesive bonding layer 14, and an intermediate layer 12 between the backing and bonding layers, and is free of a reinforcing layer, as described in U.S. Pat. No. 5,848,769. It has been found that sufficiently conformable drag reduction articles may be provided without employing such a layer. As a result, it is expected the present invention will exhibit an improved ease of manufacture, and a decreased cost of production. It is also anticipated the present invention will exhibit improved chemical fluid resistance.

In an alternative embodiment, the drag reduction article consists essentially of an outer patterned backing layer 11 having an outer exposed patterned surface, an adhesive bonding layer 14, an intermediate layer 12 between the backing and bonding layers, and an optional temporary, removable protective liner 16.

In a further embodiment, a method of reducing drag caused by a fluid flowing over a surface is provided. The method comprises the steps of:

(a) providing a surface over which a fluid may flow;

(b) providing an article capable of reducing the drag created by the fluid flowing over the surface provided in step (a); and (c) attaching the article from step (b) to the surface provided in step (a) so as to reduce the drag created by the fluid flowing over that surface.

Any of the previously described drag reduction articles may be used in step (b).

The drag reduction article (exclusive of bonding layer 14) typically and advantageously comprises thermoplastic materials so as to facilitate manufacturing the drag reduction article. Thermoplastic materials can be repeatedly reheated and reformed, which assists in manufacturing the drag reduction article by extrusion processes, as described more fully herein.

Outer patterned backing layer 11 is capable of being formed into a pattern (described more fully herein) that imparts drag reducing characteristics to article 10. In addition, outer patterned backing layer 11 is sufficiently resistant to chemical and weather exposure to permit the use of drag reduction article 10 in aerospace applications.

Intermediate layer 12 imparts good handling characteristics to the drag reduction article and promotes adhesion between outer patterned backing layer 11 and adhesive bonding layer 14. The incorporation of layer 12 also permits the use of an expanded selection of modifying materials in article 10, such as pigments, dyes, antioxidants, UV stabilizers, etc. that might not otherwise be employed due to compatibility issues with outer patterned backing layer 11.

The adhesive bonding layer 14 may be a pressure-sensitive adhesive; or a curable adhesive layer or an uncured composite article layer, either of which may be cured after application to a substrate. The adhesive bonding layer 14 adheres the drag reduction article to a substrate, e.g., the surface of an airplane, the hull of a boat or other watercraft, the surface of a motor vehicle, the surface of a windmill rotor blade, or the interior surface of a fluid-conveying conduit.

Backing Layer and Intermediate Layer

In order to achieve these desirable properties, outer patterned backing layer 11 having an outer surface with an exposed pattern thereon and intermediate layer 12 are suitably provided as blends of different polymers, at least one of which has good chemical resistance and weatherability, and at least one of which has good bonding properties. ("Polymer" is used broadly in this context to encompass both homopolymers and copolymers; i.e., polymers derived from more than one monomer.) Fluoropolymers, in particular those that contain polymerized units of vinylidene fluoride, have been found to have good chemical resistance and weatherability. Acrylic polymers, in particular those that contain polymerized units of short chain alkyl methacrylates, have been found to have good bonding properties and handling characteristics.

In one embodiment, outer patterned backing layer 11 and intermediate layer 12 are formed as different blends of the fluoropolymer and the acrylic polymer, the actual amounts depending upon the desired balance between fluid resistance, ultraviolet (UV) radiation resistance, weather resistance, and stiffness afforded by the fluoropolymer, and adhesion, flexibility and handling ability imparted by the acrylic polymer. Outer patterned backing layer 11 employs a higher weight percentage of the fluoropolymer where its UV radiation, weathering and chemical resistance properties are needed, while intermediate layer 12 uses a higher percentage of acrylic polymer where good bonding properties are needed between outer patterned backing layer 11 and adhesive bonding layer 14. In one embodiment, outer patterned backing layer 11 comprises a blend of at least about 70% by weight fluoropolymer. In another embodiment, outer patterned backing layer 11 comprises as much as about 30% by weight of acrylic polymer. In a further embodiment, outer patterned backing layer 11 comprises as much as 100% by weight of fluoropolymer. In one embodiment, outer patterned backing layer comprises a blend of as much as about 90% by weight fluoropolymer. In another embodiment, outer patterned backing layer 11 comprises at least about 10% by weight acrylic polymer. In a further embodiment, outer patterned backing layer 11 comprises about 90% by weight fluoropolymer and 10% by weight acrylic polymer. Such blends enable outer patterned backing layer 11 to withstand extended exposure to water, oil, fuel, solvents, hydraulic fluids, and the like, without a noticeable deterioration in its physical properties, performance, or appearance. Further, it is not appreciably affected by acid rain, bird dung, and other harsh environmental agents to which the drag reduction article 10 may be exposed during normal use. In one embodiment, intermediate layer 12 comprises a blend of at least about 70% by weight acrylic polymer. In another embodiment, intermediate layer 12 comprises as much as about 30% by weight of fluoropolymer. In a further embodiment, intermediate layer 12 comprises as much as 100% by weight of acrylic polymer. In one embodiment, intermediate layer 12 comprises a blend of as much as about 90% by weight acrylic polymer. In another embodiment, intermediate layer 12 comprises at least about 10% by weight fluoropolymer. In a further embodiment, intermediate layer 12 comprises about 90% by weight acrylic polymer and 10% by weight fluoropolymer. Such blends enable intermediate layer 12 to impart good handling characteristics to the drag reduction article and promote adhesion between outer patterned backing layer 11 and adhesive bonding layer 14. The incorporation of intermediate layer 12 also permits the use of an expanded selection of modifying materials in article 10, such as pigments, dyes, antioxidants, UV stabilizers, etc. that might not otherwise be employed due to compatibility issues with outer patterned backing layer 11.

Suitable vinylidene fluoride-containing fluoropolymers include poly(vinylidene fluoride) (PVDF). Also useful are copolymers derived from polymerized units of vinylidene fluoride and a monomer selected from the group consisting of ethylene, hexafluoropropylene, tetrafluoroethylene, and combinations thereof, and combinations of PVDF and copolymers of PVDF. Such materials tend to have a melt flow index (MFI) of about 6–120, when measured according to ASTM D-1238 at 230° C. and 5 kg, and an apparent viscosity of 400–30,000 Pascal•seconds, when measured at 240° C. and 50 sec$^{-1}$ by conventional means using a capillary rheometer. PVDF is suitable because it can be formed into precise patterns to provide outer patterned backing layer 11 with a drag reducing shape and provides stiffness. PVDF has the ability to retain a precise drag reducing pattern more easily than the thermoplastic materials previously used for drag reduction articles.

Various acrylic polymers may be used, e.g., medium to low molecular weight acrylic resins having a weight average molecular weight below 750,000, including blends or copolymers comprising at least two materials selected from the group consisting of methyl methacrylate, ethyl methacrylate, butyl methacrylate, and methacrylate copolymers. Poly(methyl methacrylate) (PMMA) is suitable.

Layers 11 and 12 may also include additives, such as UV stabilizers (e.g., the TINUVIN family of stabilizers available from Ciba-Geigy Corp., Hawthorne, N.Y.); antioxidants; fillers, such as glass, ceramic or polymeric bubbles; pigments; processing aids, such as polyolefin polymers; and fire retardants.

In one embodiment, outer patterned backing layer 11 may be at least about 5 micrometers (0.0002 inches) thick. In another embodiment, outer patterned backing layer 11 may be as much as about 410 micrometers (0.016 inches) thick. In one embodiment, outer patterned backing layer 11 may be at least about 13 micrometers (0.0005 inches) thick. In another embodiment, outer patterned backing layer 11 may be as much as about 40 micrometers (0.0015 inches) thick.

When used without intermediate layer 12, outer patterned backing layer 11 may be at least about 13 micrometers (0.0005 inches) thick. In another embodiment, outer patterned backing layer 11 may be as much as about 410 micrometers (0.016 inches) thick when used without intermediate layer 12.

When used in combination with intermediate layer 12, outer patterned backing layer 11 maybe at least about 5 micrometers (0.0002 inches) thick. In another embodiment, outer patterned backing layer 11 may be as much as about 410 micrometers (0.016 inches) thick when used in combination with intermediate layer 12. Intermediate layer 12 may be at least about 3 micrometers (0.0001 inches) thick. In another embodiment, intermediate layer 12 may be as much as about 410 micrometers (0.016 inches) thick. In a further embodiment, intermediate layer 12 may be as much as about 12 micrometers (0.0005 mils) thick. Overall, the combined thickness of layers 11 and 12 may be at least about 8 micrometers (0.0003 inches). In another embodiment, the overall combined thickness of layers 11 and 12 may be as much as about 415 micrometers (0.016 inches). In a further embodiment, the overall combined thickness of layers 11 and 12 is at least about 50 micrometers (0.002 inches). In another embodiment, the overall combined thickness of layers 11 and 12 is as much as about 150 micrometers (0.006 inches). If the combined thickness is greater than about 410 micrometers (0.016 inches), the conformability of the drag reduction article may be decreased, and weight and cost are added to the drag reduction article which is undesirable.

Layers 11 and 12 are typically in the form of sheet materials, each having two major surfaces. Optionally, at least one of the surfaces of these layers may be treated to allow for bonding of the adhesive bonding layer 14, depending on which layer will be adjacent to the bonding layer. Such treatment methods include corona treatment, particularly corona discharge in an atmosphere containing nitrogen, and about 0.1 to about 10 volume percent of an additive gas selected from the group consisting of hydrogen, ammonia, and mixtures thereof, as disclosed in U.S. Pat. No. 5,972,176 (Kirk et al.). Another useful treatment method includes a chemical etch using sodium naphthalenide. Such treatment methods are disclosed in *Polymer Interface and Adhesion*, Souheng Wu, Ed., Marcel Dekker, Inc., NY and Basel, pp. 279–336 (1982); and *Encyclopedia of Polymer Science and Engineering*, Second Edition, Supplemental Volume, John Wiley & Sons, pp. 674–689 (1989). Another useful treatment method is the FLUOROETCH process, available from Acton Industries, Inc., Pittston, Pa. Other treatment methods include the use of such materials as primers. These may be employed either in place of, or in addition to the surface treatments described above. An example of a useful primer is ADHESION PROMOTER #86A (a liquid primer, available from 3M Company, St. Paul, Minn.).

Figure 3:
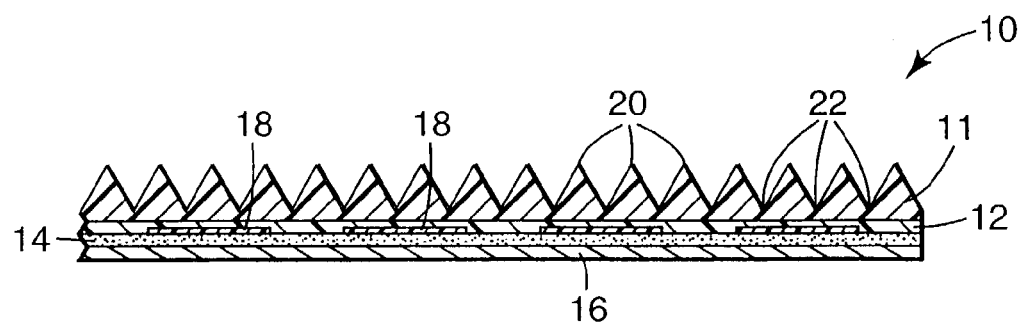
FIG. 3 is sectional view similar to FIG. 2 but showing an alternative embodiment, of the invention in which the drag reduction articles bears graphic indicia.

A graphic layer 18 may be applied to outer patterned backing layer 11 or intermediate layer 12 or, as shown-in FIG. 3, adhesive bonding layer 14.

Adhesive Bonding Layer

The adhesive bonding layer 14 adheres the drag reduction article to a substrate, e.g., the surface of an airplane, the hull of a boat or other watercraft, the surface of a motor vehicle, the surface of a windmill rotor blade, or the interior surface of a fluid-conveying conduit.

In one embodiment, the adhesive bonding layer 14 is applied to outer patterned backing layer 11 on the side opposite the side having the patterned surface. Adhesive bonding layer 14 may be selected from adhesives, such as room temperature pressure-sensitive adhesives (PSAs), hot melt PSAs, thermoplastics, or a curable adhesive, such as a moisture curing adhesive, thermosetting adhesive, or a prepreg material (e.g., one containing a curable organic resin matrix and reinforcing material, such as inorganic fibers). In another embodiment when intermediate layer 12 is employed, such bonding layers may be applied to the surface of intermediate layer opposite that which is adjacent to outer patterned backing layer 11.

In one embodiment, the adhesive is a room temperature PSA. An example of a room temperature PSA is an acrylate pressure-sensitive adhesive. Such materials possess a four-fold balance of adhesion, cohesion, stretchiness, and elasticity, and a glass transition temperature ($T_g$) of less than about 20° C. Thus, they are tacky to the touch at room temperature (e.g., about 20° C. to about 25° C.), as can be determined by a finger tack test or by conventional measurement devices, and can easily form a useful adhesive bond with the application of light pressure. An acceptable quantitative description of a pressure-sensitive adhesive is given by the Dahlquist criterion line (as described in the Handbook of Pressure Sensitive Adhesive Technology, Second Edition, D. Satas, ed., Van Nostrand Reinhold, New York, N.Y., pages 171–176 (1989)), which typically indicates that materials having a storage modulus (G') of less than about $3 \times 10^5$ Pascals (measured at 10 radian/second at a temperature of about 20° C. to about 22° C.) have pressure-sensitive adhesive properties while materials having a G' in excess of this value do not.

Useful acrylic pressure-sensitive adhesives include those that comprise a polymer of an acrylate ester of acrylic acid with a non-tertiary alcohol. Multifunctional acrylates, copolymerizable photoinitiators, or combinations of the two may also be present so as to provide some crosslinking, which can contribute to easy removability, better fluids resistance and improved high temperature performance of the drag reduction article. Ultimately, removability is a balance among the peel adhesion, the degree of crosslinking, and the thickness of the bonding layer. Pressure-sensitive adhesives suitable for the bonding layer and methods for their preparation are disclosed in U.S. Pat. No. 6,475,616 (Dietz et al) and described below.

Useful thermally or moisture curable adhesives include epoxy resins (epoxide resin+curing agent), acrylates, cyanoacrylates, and urethanes (isocyanate terminated compound+ active hydrogen-containing compound). The curable adhesives used in the drag reduction articles of the invention are non-tacky to the touch after curing; that is, after curing they cannot be reheated and reflowed. Further, drag reduction articles of the invention may be applied to prepreg material (i.e., one containing a curable organic resin matrix and reinforcing material, such as inorganic fibers), also referred to herein as uncured composite articles. When used in this manner, the curable organic resin of the prepreg material may act as the adhesive bonding layer 14 thereby eliminating the need for a separate bonding layer 14 to be provided on the drag reduction article.

Acrylic Adhesive

The acrylate pressure-sensitive adhesive copolymers used herein are advantageous because they show desirable adhesive properties over a broad temperature range, particularly at low temperatures, to a wide variety of substrates. In addition, they show desirable adhesive properties even after exposure to various fluids.

Suitable poly(acrylates) are derived from: (A) at least one monofunctional alkyl (meth)acrylate monomer (i.e., alkyl acrylate and alkyl methacrylate monomer); and (B) at least one monofunctional free-radically copolymerizable acid-containing reinforcing monomer. The reinforcing monomer has a homopolymer glass transition temperature ($T_g$) higher than that of the alkyl (meth)acrylate homopolymer and is one that increases the glass transition temperature and modulus of the resultant copolymer. Herein, "copolymer" refers to polymers containing two or more different monomers, including terpolymers, tetrapolymers, etc.

In one embodiment, the monomers used in preparing the pressure-sensitive adhesive copolymers of the present invention include: Monomer A—a monofunctional alkyl (meth)acrylate monomer that, when homopolymerized, generally has a glass transition temperature of no greater than about 0° C.; and monomer B—a monofunctional free-radically copolymerizable acid-containing reinforcing monomer that, when homopolymerized, generally has a glass transition temperature of at least about 10° C. The glass transition temperatures of the homopolymers of monomers A and B are typically accurate to within ±5° C. and are measured by differential scanning calorimetry.

Monomer A, which is a monofunctional alkyl acrylate or methacrylate (i.e., (meth)acrylic acid ester), contributes to the flexibility and tack of the copolymer. Exemplary materials used for monomer A have a homopolymer $T_g$ of no greater than about 0° C. In one embodiment, the alkyl group of the (meth)acrylate has an average of about 4 to about 20 carbon atoms, and in another embodiment, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, isooctyl acrylate, n-decyl acrylate, isodecyl acrylate, isodecyl methacrylate, and isononyl acrylate. Other examples include, but are not limited to, poly-ethoxylated or -propoxylated methoxy (meth)acrylate (i.e., poly(ethylene/ propylene oxide) mono-(meth)acrylate) macromers (i.e., macromolecular monomers), polymethylvinyl ether mono (meth)acrylate macromers, and ethoxylated or propoxylated nonyl-phenol acrylate macromers. The molecular weight of such macromers is typically about 100 grams/mole to about 600 grams/mole, and in another embodiment, about 300 grams/mole to about 600 grams/mole. Suitable monofunctional (meth)acrylates that can be used as monomer A include 2-methylbutyl acrylate, isooctyl acrylate, lauryl acrylate, and poly(ethoxylated) methoxy acrylate (i.e., methoxy terminated poly(ethylene glycol) mono-acrylate or poly (ethyleneoxide) mono-methacrylate). Combinations of various monofunctional monomers categorized as an A monomer can be used to make the pressure-sensitive copolymer used in making the appliques of the present invention.

Monomer B, which is a monofunctional free-radically copolymerizable acid-containing reinforcing monomer increases the glass transition temperature of the copolymer. As used herein, "reinforcing" monomers are those that increase the modulus of the adhesive, and thereby its strength. Exemplary materials used for monomer B have a homopolymer $T_g$ of at least about 10° C. As used herein, "acid-containing" monomers are those that include acid functionality, such as an acrylic acid or a methacrylic acid functionality. Examples of monomer B include, but are not limited to, acrylic acid and methacrylic acid, itaconic acid, crotonic acid, maleic acid, and fumaric acid. A suitable reinforcing monofunctional acrylic monomer that can be used as monomer B includes acrylic acid and methacrylic acid. Combinations of various reinforcing monofunctional monomers categorized as a B monomer can be used to make the copolymer used in making the drag reduction articles of the present invention.

Optionally, if desired, the copolymer can also include a monofunctional free-radically copolymerizable neutral or nonpolar reinforcing monomer in addition to the acid-containing monomer. Examples of such monomers include, but are not limited to, 2,2-(diethoxy)ethyl acrylate, hydroxyethyl acrylate or methacrylate, 2-hydroxypropyl acrylate or methacrylate, methyl methacrylate, isobutyl acrylate, n-butyl methacrylate, norbomyl acrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, and N-vinyl pyrrolidone. Combinations of such neutral reinforcing monofunctional monomers can be used to make the copolymer used in making the appliques of the present invention.

In one embodiment, the acrylate copolymer is formulated to have a resultant $T_g$ of less than about 25° C. and in another embodiment, less than about 0° C. Such acrylate copolymers suitably include about 80% by weight to about 96% by weight of at least one alkyl (meth)acrylate repeat unit and about 4% by weight to about 20% by weight of at least one copolymerizable acid-containing reinforcing repeat unit. In another suitable embodiment, the acrylate copolymers include about 85% by weight to about 95% by weight of at least one alkyl (meth)acrylate repeat unit and about 5% by weight to about 15% by weight of at least one copolymerizable acid-containing reinforcing repeat unit. These weight percentages are based on the total weight of the monomers.

One or more nonionic crosslinking agents that may, or may not, be copolymerizable with monomers A and B, can be used in the pressure-sensitive adhesives of the appliques of the present invention if desired. A crosslinking agent is referred to herein as component C. Typically, component C modifies the adhesion of the pressure-sensitive adhesive and improves its cohesive strength. The crosslinking agent typically produces chemical crosslinks (e.g., covalent bonds). Prior to application of the drag reduction article to a substrate, the crosslinking functionality is consumed, i.e., it is essentially completely reacted with monomers A and B or copolymers thereof. Crosslinking can contribute to easy removability, better fluids resistance and improved high temperature performance of the drag reduction article.

When component C contains ethylenic unsaturation, it is incorporated into the backbone of the copolymer by copolymerization with monomers A and B through the ethylenic unsaturation. Such crosslinking agents are disclosed in U.S. Pat. No. 4,379,201 (Heilmann et al.); U.S. Pat. No. 4,737,559 (Kellen et al.); U.S. Pat. No. 5,073,611 (Rehmer et al.); and U.S. Pat. No. 5,506,279 (Babu et al.). Alternatively, component C can be essentially independent of the polymeric backbone. Materials of this type can cause crosslinking by, for example, reaction with the pendant carboxylic acid group of monomer B as disclosed in U.S. Pat. No. 5,604,034 (Matsuda), or by photoactivated hydrogen abstraction as disclosed in U.S. Pat. No. 4,330,590 (Vesley) and U.S. Pat. No. 4,329,384 (Vesley). Matsuda discloses the use of multifunctional crosslinking agents whose functionalities are reactive with carboxylic acid groups, while Vesley describes additives that can cause crosslinking upon exposure to ultraviolet radiation (e.g., radiation having a wavelength of about 250 nanometers to about 400 nanometers).

In one embodiment, component C is (1) a copolymerizable olefinically unsaturated compound, which, in the excited state, is capable of abstracting hydrogen; (2) a compound having at least two reactive functional groups reactive with carboxylic acid groups; or (3) a noncopolymerizable compound which, in the excited state, is capable of abstracting hydrogen. Component C1 is a free-radically polymerizable monomer capable of polymerizing with monomers A and/or B. Components C2 and C3 are essentially free of olefinic unsaturation and thus typically not copolymerizable with monomers A and/or B. Combinations of various crosslinking agents can be used to make the pressure-sensitive adhesive of the present invention.

One type of nonionic crosslinking agent (i.e., component C1) is an olefinically unsaturated compound that is copolymerized with monomers A and B and generates free radicals on the polymer upon irradiation of the polymer. Examples of such a compound include an acrylated benzophenones, as described in U.S. Pat. No. 4,737,559 (Kellen et al.); p-acryloxy-benzophenone, which is available from Sartomer Company, Exton, Pa.; and monomers described in U.S. Pat. No. 5,073,611 (Rehmer et al.), including p-N-(methacryloyl-4-oxapentamethylene)-carbamoyloxybenzophenone, N-(benzoyl-p-phenylene)-N'-(methacryloxymethylene)-carbodiimide, and p-acryloxy-benzophenone. U.S. Pat. No. 5,506,279 (Babu et al.) at columns 5–6, describes another suitable olefinically unsaturated crosslinking agent referred to therein as Formula 2, which is {2-[4-(2-hydroxy-2-methyl-propan-1-one)phenoxy]}ethyl (2-methyl-2-(2-methyl-2-propen-1-one) amino)propanoate. The olefinically unsaturated compound which, in the excited state, is capable of abstracting hydrogen suitably includes acrylic functionality. Combinations of such crosslinking agents can be used to make the pressure-sensitive adhesive used in the present invention.

A second type of nonionic crosslinking agent (i.e., component C2) is a crosslinking compound which is essentially free of olefinic unsaturation and is capable of reacting with the carboxylic acid groups of monomer B. It includes at least two functional groups reactive with carboxylic acid groups. It may be added to a mixture of monomers A and B prior to their polymerization, or after they have been formed into a partially polymerized syrup, or to a copolymer of monomers A and B. Examples of such components include, but are not limited to, 1,4-bis(ethyleneiminocarbonylamino)benzene; 4,4-bis(ethyleneiminocarbonylamino)diphenylmethane; 1,8-bis(ethyleneiminocarbonylamino)octane; 1,4-tolylene diisocyanate; and 1,6-hexamethylene diisocyanate, as described in U.S. Pat. No. 5,604,034 (Matsuda). Another example is N,N'-bis-1,2-propyleneisophthalamide, as described in U.S. Pat. No. 4,418,120 (Kealy et al.). Other such crosslinking agents are available from K.J. Quin and Co., Seabrook, N.H., and EIT Inc., Lake Wyllie, S.C. Other examples of C2 crosslinking agents include diepoxides, dianhydrides, bis(amides), and bis(imides). Combinations of such crosslinking agents can be used to make the pressure-sensitive adhesive used in the present invention.

A third type of nonionic crosslinking agent (i.e., component C3) is a compound which is essentially free of olefinic unsaturation, is noncopolymerizable with monomers A and B, and, in the excited state, is capable of abstracting hydrogen. It is added to a copolymer of monomers A and B, or a partially polymerized syrup of monomers A and B. Upon irradiation of the mixture, component C3 generates free radicals on the polymer or partially polymerized material. Examples of such components include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy) phenyl)-s-triazine; 2,4-bis(trichloromethyl)-6-(3-methoxy) phenyl)-s-triazine, as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine, as described in U.S. Pat. No. 4,329,384 (Vesley). Combinations of such crosslinking agents can be used to make the pressure-sensitive adhesive used in the present invention.

Another type of crosslinking agent that can be used in addition to one or more of components C1–C3, is an acrylic crosslinking monomer (component C4) containing at least two acrylic moieties. Suitable such materials have an average of less than about 12 atoms in the chain between acrylic groups. Examples of this type of crosslinking agent include, but are not limited to, trimethylolpropane triacrylate, 1,6-hexanediol diacrylate, pentaerythritol tetraacrylate, 1,2-ethylene glycol diacrylate, dodecyl diacrylate, and the diacrylate of ethylene oxide modified bisphenol A.

If used, the crosslinking agent is used in an effective amount, by which is meant an amount that is sufficient to cause crosslinking of the pressure-sensitive adhesive to provide adequate cohesive strength to produce the desired final adhesion properties to the substrate of interest. In one embodiment, the crosslinking agent is used in an amount of about 0.01 part to about 2 parts by weight, based on 100 parts of the copolymer.

If a photocrosslinking agent has been used, the adhesive can be exposed to ultraviolet radiation having a wavelength of about 250 nm to about 400 nm. The radiant energy in this suitable range of wavelength required to crosslink the adhesive is about 100 milljoules/centimeter$^2$ (mJ/cm$^2$) to about 1,500 mJ/cm$^2$, and in another embodiment, about 200 mJ/cm$^2$ to about 800 mJ/cm$^2$.

Preparation of Acrylate Copolymers

The acrylate pressure-sensitive adhesives of the present invention can be synthesized by a variety of free-radical polymerization processes, including solution, radiation, bulk, dispersion, emulsion, and suspension polymerization processes. Polymerization of the monomers to form the copolymer useful in the pressure-sensitive adhesive composition of the present invention is typically carried out using thermal energy, electron-beam radiation, ultraviolet radiation, and the like. Such polymerizations can be facilitated by a polymerization initiator, which can be a thermal initiator or a photoinitiator. Examples of suitable photoinitiators include, but are not limited to, benzoin ethers, such as benzoin methyl ether and benzoin isopropyl ether, substituted benzoin ethers, such as anisoin methyl ether, substituted acetophenones, such as 2,2-dimethoxy-2-phenylacetophenone, and substituted alpha-ketols, such as 2-methyl-2-hydroxypropiophenone. Examples of commercially available photoinitiators include IRGACURE 651 and DAROCUR 1173, both available from Ciba-Geigy Corp., and LUCERIN TPO from BASF, Parsippany, N.J. Examples of suitable thermal initiators include, but are not limited to, peroxides, such as dibenzoyl peroxide, dilauryl peroxide, methyl ethyl ketone peroxide, cumene hydroperoxide, dicyclohexyl peroxydicarbonate, as well as 2,2-azo-bis(isobutyronitrile), and t-butyl perbenzoate. Examples of commercially available thermal initiators include VAZO 64, available from ACROS Organics, Pittsburgh, Pa., and LUCIDOL 70, available from Elf Atochem North America, Philadelphia, Pa. The polymerization initiator is used in an amount effective to facilitate polymerization of the monomers. The polymerization initiator is suitably used in an amount of about 0.1 part to about 5.0 parts by weight, and in another embodiment, about 0.2 part to about 1.0 part by weight, based on 100 parts of the copolymer.

If a photocrosslinking agent is used, the coated adhesive can be exposed to ultraviolet radiation having a wavelength of about 250 nm to about 400 nm. The radiant energy in this suitable range of wavelength required to crosslink the adhesive is about 100 millijoules/cm$^2$ to about 1,500 millijoules/cm$^2$, and in another embodiment, about 200 millijoules/cm$^2$ to about 800 millijoules/cm$^2$.

The copolymers of the present invention can be prepared by a variety of techniques, which may or may not include solvent or chain transfer agents (e.g., $CBr_4$) to control molecular weight. These techniques may involve the use of appropriate polymerization initiators. A suitable solvent-free polymerization method using monomers A, B, and a crosslinking agent is disclosed in U.S. Pat. No. 4,379,201 (Heilmann et al.). Initially, a mixture of monomers A and B is polymerized with a portion of a photoinitiator by exposing the mixture to UV radiation in an inert environment for a time sufficient to form a coatable base syrup, and subsequently adding a crosslinking agent and the remainder of the photoinitiator. This final syrup containing a crosslinking agent (e.g., having a Brookfield viscosity of about 100 centipoise to about 6000 centipoise at 23° C., as measured with a No. 4 LTV spindle, at 60 revolutions per minute) is then coated onto a substrate, such as a backing. Once the syrup is coated onto a backing, further polymerization and crosslinking is typically carried out in an inert environment (i.e., an environment that is nonreactive with the monomer mixture). Suitable inert environments include nitrogen, carbon dioxide, helium, and argon, which exclude oxygen. A sufficiently inert atmosphere can be achieved by covering a layer of the photoactive syrup with a polymeric film, such as silicone-treated polyethylene terephthalate (PET) film, that is transparent to UV radiation or e-beam and irradiating through the film in air.

A suitable solution polymerization method for preparing a copolymer using monomers A, B, and optionally a crosslinking agent, is disclosed in U.S. Pat. No. 5,073,611 (Rehmer et al.). Suitable solvents for such preparation methods include, for example, hydrocarbons, such as benzene, toluene, xylene, normal hexanes, cyclohexane, as well as esters, alcohols, ethers, and mixtures thereof. For carrying out the polymerization in solution, some or all of the solvent is heated with some of the monomer mixture and some or all of the thermal initiator. When the polymerization begins, the remainder of the monomer mixture, and where relevant, the remainder of the thermal initiator and the solvent are added. After polymerization, the composition can be coated onto a backing and the solvent can be removed by evaporation with or without heat.

A latex polymerization method for preparing a copolymer using monomers A, B, and a crosslinking agent, is disclosed in U.S. Pat. No. 5,424,122 (Crandall et al.). For example, a latex emulsion polymerization is carried out by combining monomers A, B, and a crosslinking agent, an oleophilic nonionic free radical initiator, water, and a nonionic surfactant. The mixture is homogenized to form an emulsion followed by initiation of free radical polymerization, typically done using heat, while agitating the emulsion under an inert atmosphere. After polymerization, the latex can be coated onto a backing and dried, typically at a temperature of at least about 65° C. If necessary, water can be added or removed to reach an appropriate coating viscosity.

A pressure-sensitive adhesive composition may be applied to the outer patterned backing layer 11, or intermediate layer 12 when it is employed, by a variety of coating methods including knife coating, slotted knife coating, reverse roll coating, coextrusion, or lamination (e.g., if the adhesive has been initially coated onto a release liner). If the composition includes a solvent, it is then dried at a temperature (e.g., about 65° C. to about 120° C.) and a time (e.g., several minutes to about one hour) so as to provide a drag reduction article. The thickness of the layer of adhesive may vary over a broad range of about 10 micrometers to hundreds of micrometers.

Once the adhesive composition has been substantially fully cured and optionally crosslinked so as to provide a drag reduction article, the adhesive surface of the article may, optionally, be protected with a temporary, removable release liner (i.e., protective liner) such as a paper liner or plastic films, such as polyolefin (e.g., polyethylene or polypropylene) or polyester (e.g., polyethylene terephthalate) film. Such paper or films may be treated with a release material, such as silicones, waxes, fluorocarbons, and the like. Only after the adhesive composition has been substantially fully cured and optionally crosslinked such that there is substantially no unsaturation are the drag reduction articles of the present invention applied to a substrate.

Curable Adhesive

The outer patterned backing layer 11 of the present invention may be adhered to a substrate using a curable adhesive bonding layer 14, such as a thermally or moisture curable adhesive. Alternatively, such bonding layers may be applied to intermediate layer 12 when it is employed. Examples of such curable adhesives include epoxy resins (epoxide resin+curing agent), acrylates, cyano-acrylates, and urethanes. The curable adhesives used in the drag reduction articles of the invention are non-tacky to the touch after curing and are thermosetting.

Epoxide Resins

Epoxide resins useful in the drag reduction articles of the invention are any organic compounds having at least one oxirane ring, that is,

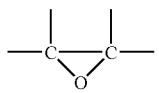

polymerizable by a ring opening reaction. Such materials, broadly called epoxides, include both monomeric and polymeric epoxides and can be aliphatic, heterocyclic, cycloaliphatic, or aromatic, and can be combinations thereof. They can be liquid or solid or blends thereof, blends being useful in providing tacky adhesive films prior to cure. In one embodiment, these materials generally have, on the average, at least two epoxy groups per molecule and are also called "polyepoxides." The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more.

Useful epoxide resins include those which contain cyclohexene oxide groups, such as the epoxycyclohexane carboxylates, typified by 3,4-epoxycyclohexylmethyl-3,4-epoxycyclohexane carboxylate, 3,4-epoxy-2-methylcyclohexylmethyl-3,4-epoxy-2-methycyclohexane carboxylate, and bis(3,4-epoxy-6-methylcyclohexylmethyl) adipate. For a more detailed list of useful epoxides of this nature, reference may be made to U.S. Pat. No. 3,117,099, incorporated herein by reference.

Further epoxide resins which are particularly useful in the practice of this invention include glycidyl ether monomers of the formula:

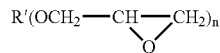

where R' is aliphatic, for example, alkyl; aromatic, for example, aryl; or combinations thereof; and n is an integer of 1 to 6. Examples are the glycidyl ethers of polyhydric phenols, such as the diglycidyl ether of 2,2-bis-(4-hydroxyphenol)propane (Bisphenol A) and copolymers of (chloromethyl)oxirane and 4,4'-(1-methylethylidene)bisphenol. Further examples of epoxides of this type which can be used in the practice of this invention are described in U.S. Pat. No. 3,018,262, incorporated herein by reference.

There are a host of commercially available epoxide resins that can be used in this invention. In particular, epoxides which are readily available include styrene oxide, vinylcyclohexene oxide, glycidol, glycidyl methacrylate, diglycidyl ether of Bisphenol A (for example, those available under the trade designations "EPON 828", "EPON 1004", and "EPON 1001F" from Shell Chemical Company, Houston, Tex., and "DER-332" and "DER-334", from Dow Chemical Company, Midland, Mich.), diglycidyl ether of Bisphenol F (for example, those under the trade designations "ARALDITE GY281" from Ciba-Geigy Corp., and "EPON 862" from Shell Chemical Company), vinylcyclohexane dioxide (for example, having the trade designation "ERL-4206" from Union Carbide Corporation, Midland, Mich.), 3,4-epoxycyclohexyl-methyl-3,4-epoxycyclohexene carboxylate (for example, having the trade designation "ERL-4221" from Union Carbide Corporation), 2-(3,4-epoxycyclohexyl-5,5-spiro-3,4-epoxy) cyclohexane-metadioxane (for example, having the trade designation "ERL-4234" from Union Carbide Corporation), bis(3,4-epoxycyclohexyl) adipate (for example, having the trade designation "ERL-4299" from Union Carbide Corporation), dipentene dioxide (for example, having the trade designation "ERL-4269" from Union Carbide Corporation), epoxidized polybutadiene (for example, having the trade designation "OXIRON 2001" from FMC Corporation), flame retardant epoxide resins (for example, having the trade designation "DER-542", a brominated bisphenol type epoxy resin available from Dow Chemical Company), 1,4-butanediol diglycidyl ether (for example, having the trade designation "ARALDITE RD-2" from Ciba-Geigy Corp.), diglycidyl ether of hydrogenated Bisphenol A based epoxide resins (for example, having the trade designation "EPONEX 1510" from Shell Chemical Company), and polyglycidyl ether of phenol-formaldehyde novolak (for example, having the trade designations "DEN-431" and "DEN-438" from Dow Chemical Company).

Epoxide Resin Curing Agent

The term "curing agent" is used broadly to include not only those materials that are conventionally regarded as curing agents but also those materials that catalyze epoxy polymerization as well as those materials that may act as both curing agent and catalyst. Suitable curing agents for the epoxide resin include, for example, room temperature curing agents, heat-activated curing agents, and combinations thereof, and photolytically activated curing agents. Room temperature curing agents and heat-activated curing agents can include, for example, blends of epoxy homopolymerization type curing agents and addition type curing agents. The curing agents react at temperatures of between about room temperature and about 200° C., about room temperature and 150° C., or alternatively between about room temperature and about 115° C. If the curing agents are used in epoxy resins that are used to make prepregs to make composite articles, then suitable curing agents react at temperatures in the range of about 200° F. (93° C.) to about 350° F. (177° C.), and in another embodiment, about 200° F. (93° C.) to about 250° F. (121° C.).

Examples of suitable curing agents include polybasic acids and their anhydrides, for example, di-, tri- and higher carboxylic acids, such as oxalic acid, phthalic acid, terephthalic acid, succinic acid, maleic acid, alkyl and alkenyl substituted succinic acids, tartaric acid, and anhydrides, for example, phthalic anhydride, succinic anhydride, maleic anhydride, nadic anhydride and pyromellitic anhydride; polymerizable unsaturated acids, for example, those containing at least 10 carbon atoms, for example, dodecendioic acid, 10,12-eicosadiendioic acid; and mercaptans.

Examples of other suitable curing agents include nitrogen containing compounds, for example, benzyldimethylamine, benzylamine, N,N-diethyl aniline, melamine, pyridine, hydrazides, and aromatic polyamines, such as o-, m-, and p-phenylene diarnine, 4,4'-diaminodiphenyl sulfone, 3,3'-diaminodiphenyl sulfone, and 4,4'-diaminodiphenyl sulfide, 4,4'-diaminodiphenyl ketone, 4,4'-diaminodiphenyl ether, 4,4'-diaminodiphenyl methane, 1,3-propanediol-bis(4-aminobenzoate), fluorene-containing amines (for example, 9,9-bis(4-aminophenyl)fluorene, 9,9-bis(3-methyl-4-aminophenyl)fluorene, 9,9-bis(3,5-dimethyl-4-methylaminophenyl) fluorene, 9,9-bis(3,5-dimethyl-4-aminophenyl)fluorene, 9,9-bis(3,5-diisopropyl-4-aminophenyl)fluorene, and 9,9-bis(3-chloro-4-aminophenyl)fluorene); 1,4-bis[α-(4-aminophenyl)-α-methylethyl]benzene, 1,4-bis[α-(4-amino-3,5-dimethylphenyl)-α-methylethyl]benzene, bis(4-amino-3-methylphenyl)sulfone, 1,1'-biphenyl-3,3'-dimethyl-4,4'-diamine, 1,1'-biphenyl-3,3'-dimethoxy-4,4'-diamine, 4,7,10-trioxatridecane-1,13-diamine, and diaminonaphthalenes.

Suitable curing agents include, for example, aliphatic nitrogen-containing compounds, including poly(ether) amines, guanidines (for example, dicyandiamide and tetramethyl guanidine), imidazoles (for example, 2-ethyl-4-methyl imidazole), cyclohexylamine, diethylenetriamine, triethylenetetraamine, cyclohexyldiamine, tetramethylpiperamine, N,N-dibutyl-1,3-propane diamine, N,N-diethyl-1,3-propane diamine, 1,2-diamino-2-methyl-propane, 2,3-diamino-2-methylbutane, 2,3-diamino-2-methylpentane, and 2,4-diamino-2,6-dimethyloctane.

Examples of suitable phenolic curing agents include polyhydric phenols, for example, pyrocatechol, resorcinol, hydroquinone, 4,4'-dihydroxydiphenyl methane, 4,4'-dihydroxydiphenyl dimethylmethane, 4,4'-dihydroxy-3,3'-dimethyldiphenyl methane, 4,4'-dihydroxydiphenyl methylmethane, 4,4'-dihydroxydiphenyl cyclohexane, 4,4'-dihydroxy-3,3'-dimethyldiphenyl dimethylmethane, 4,4'-dihydroxydiphenyl sulfone, and tris-(4-hydroxyphenyl)methane; and 9,9-bis(4-hydroxyphenyl) fluorene and orthosubstituted analogs thereof.

Other useful curing agents include chloro-, bromo-, and fluoro-containing Lewis acids of aluminum, boron, antimony, and titanium, such as aluminum trichloride, aluminum tribromide, boron trifluoride, antimony pentafluoride, titanium tetrafluoride, and the like. It is also desirable at times that these Lewis acids be blocked to increase the latency of adhesive compositions containing them. Representative of blocked Lewis acids are $BF_3$-monoethylamine, and the adducts of $SbF_5X$, in which X is a halogen, —OH, or —$OR^1$ in which $R^1$ is the residue of an aliphatic or aromatic alcohol, aniline, or a derivative thereof, as described in U.S. Pat. No. 4,503,211.

Suitable photolytically activated curing agents include, for example, iodonium and sulfonium salts of antimony and cobalt, and bis(arene) iron compounds.

Examples of commercially available curing agents suitable for use in the epoxides include EPI-CURE 8535-W-50 and EPI-CURE 8537-WY-60 (available from Shell Chemical Company), HY 955 (available from Ciba Specialty Chemicals Corporation), AMICURE CG-1400, ANCAMINE 2337S, CUREZOL 2E4MZ, and CUREZOL PHZ-S (available from Air Products, Pacific Anchor Chemical, Allentown, Pa.), and DCA-221 (available from Dixie Chemical Company, Pasadena, Tex.).

The curing agent may be present in an amount of about 2 to about 110 parts by weight, per 100 parts by weight of the epoxide resin. When the curing agent is a carboxylic acid, a guanidine, a phenol, an anhydride, or a primary or secondary amine, the curing agent suitably is present in about 0.5 to about 1.7 equivalents of acid, anhydride, or amine per equivalent of epoxide group. When the curing agent is an anhydride or a phenol, accelerators may be added in amounts of about 0.1% to about 5.0% based on the weight of epoxide resin. Accelerators may also be used alone and in the amounts noted. Examples of suitable accelerators include aromatic tertiary amines, such as benzyldimethyl amine, and imidazoles, such as 2-ethyl-4-methylimidazole. Lewis acids are used in amounts of between about 0.1 and about 5% by weight based on the total weight of the epoxide resin.

Epoxy, Acrylate, Cyano-Acrvlate, and Urethane Adhesives

Useful epoxy resin adhesives include 3M™ Scotch-Weld™ epoxy resin adhesives available from 3M Company, for example, having product names DP-100; DP-105; DP-110; DP-125; DP-190; DP-270; DP-420; DP-460; 1751; 1833; 1838; 2158; 2210; 2216; and 3601.

Other useful epoxy resin compositions are those that contain glycidyl ethers of hydroxy-phenylfluorene and/or an aminophenyl fluorene curing agent. These and other useful epoxy resin compositions that may be used as a curable adhesive are generally described in U.S. Pat. Nos. 4,684,678; 4,707,534; 4,777,084; 5,276,106; 5,369,192; 5,728,755; and 6,054,221.

Commercially available examples of curable crosslinking acrylate adhesives include 3M™ Scotch-Weld™ DP-8005 and the Pronto™ Instant Adhesives line of cyano-acrylate adhesives (available from 3M Company).

Useful urethane adhesives include those that cure by exposure to moisture and crosslink. Commercially available curable urethane adhesives include those having the product names of 3M™ Scotch-Weld™ DP-605NS; 3592; 3535; and 3549 (available from 3M Company).

The thickness of the adhesive bonding layer 14 is not critical and may be at least about 2.5 micrometers (0.0001 inches) thick. In another embodiment, the adhesive bonding layer 14 may be as much as about 125 micrometers (0.005 inches) thick. In one embodiment, adhesive layer 14 is at least about 13 micrometers (0.0005 inches) thick. In another embodiment, adhesive bonding layer 14 may be as much 50 micrometers (0.002 inches) thick. If the adhesive bonding layer thickness is greater than about 125 micrometers, then it may become more susceptible to swelling by fluids and the weight of the article may be unnecessarily increased. However, if the bonding layer thickness is less than about 2.5 micrometers, it may not provide enough adhesion to hold the drag reduction article in place during use.

Drag reduction article 10 may further and optionally include a temporary liner 16 that protects adhesive bonding layer 14 from contamination by dirt and other materials and which is removed shortly before the drag reduction article is applied to a surface. Liner 16 may be provided as, for example, an untreated polyolefin sheet, or a silicone- or fluorosilicone-treated paper or plastic sheet.

Figure 4:
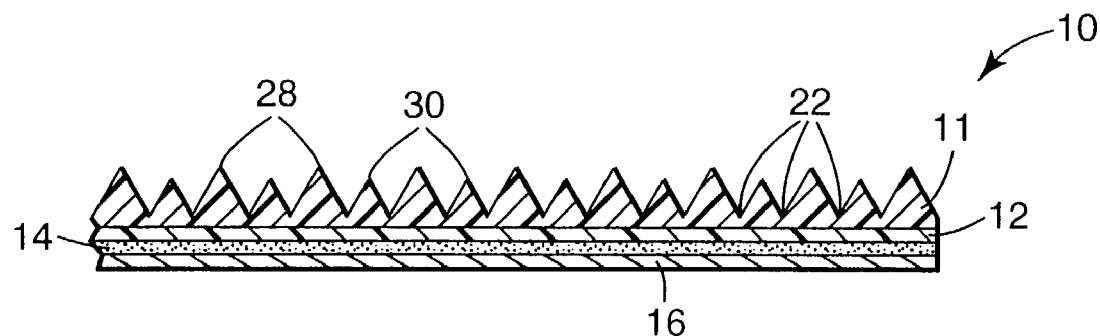
FIG. 4 is a sectional view analogous to FIG. 2 but showing a different patterned surface useful in drag reduction articles according to the invention.
Figure 5:
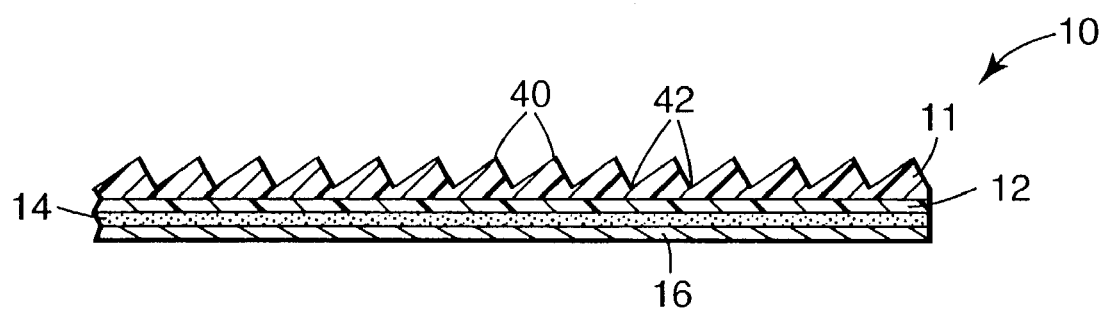
FIG. 5 is a sectional view similar to FIG. 4 and illustrating another patterned surface useful in drag reduction articles according to the invention.

The outer patterned backing layer 11 includes a patterned outer surface adapted to reduce the resistance (drag) to a fluid (e.g., air, gas, water, etc.) flowing over layer 11. In general, and still referring to FIGS. 1 to 3, the patterned surface comprises a series of essentially parallel peaks 20 separated by a series of essentially parallel valleys 22. In cross-section the patterned surface may assume a variety of wave forms. For example, FIGS. 1 to 3 show a symmetric saw tooth pattern in which each of the peaks are identical as are each of the valleys. FIG. 4 shows a series of parallel peaks 28 and 30 that are of different heights, separated by a series of parallel valleys 22. FIG. 5 shows a saw tooth pattern of alternating, parallel, asymmetric peaks 40 separated by a series of parallel, asymmetric valleys 42.

While only continuous peaks and valleys are shown, a discontinuous pattern of peaks and valleys is also contemplated. Thus, for example, the peaks and valleys may terminate for a portion of the article. The valleys may either narrow or widen as the peak or valley progresses from one end of the article to the other. Still further, the height and/or width of a given peak or valley may change as the peak or valley progresses from one end of the article to the other.

The dimensions of the peaks and valleys are not critical to the invention provided that whatever patterned surface is employed, it provides the desired reduction in drag. The optimum dimensions are somewhat dependent upon the speed at which the substrate to be covered passes through the fluid (or the speed at which the fluid passes over the substrate). For more discussion on this topic, see AIAA-88-0138, "Drag Reduction for External Boundary Layers Using Riblets and Polymers," L. W. Reidy and G. W. Anderson, presented at the AIAA 26th Aerospace Sciences Meeting, Jan. 11–14, 1988 at Reno, Nev. However, it has been found that peaks having a height of at least about 10 micrometers (0.0004 inches) are useful. In another embodiment, peaks having a height of as much as about 250 micrometers (0.010 inches) are useful. In one embodiment, the peaks are at least about 20 micrometers (0.0008 inches) high for high speed uses (e.g., aircraft). In another embodiment, the peaks are as much as about 150 micrometers (0.006 inches) high for high speed uses (e.g., aircraft). The peak-to-peak spacing between adjacent peaks likewise is not critical to the invention. A spacing of at least about 10 micrometers (0.0004 inches) is useful. In another embodiment, a spacing of as much as about 250 micrometers (0.010 inches) is useful. For aircraft applications, a spacing of at least about 20 micrometers (0.0008 inches) is useful. In another embodiment, a spacing of as much as about 150 micrometers (0.006 inches) is useful. The included angle between adjacent peaks can also vary. The valleys may be flat, round, or V-shaped. The peaks are generally V-shaped and have an included angle of at least about 15°. In another embodiment, the included angle may be as much as about 140°. In one embodiment, the included angle may be at least about 50°. In another embodiment, the included angle may be as much as about 60°.

Drag reduction articles according to the invention may be readily manufactured by a variety of techniques. For example, the drag-reducing pattern may be imparted during the manufacture of layers 11 and/or 12, or alternatively, a pre-formed web comprising one or more of layers 11, 12, 14, and 16 may be provided and a drag-reducing pattern formed in layer 11. Once manufactured, the drag reduction article can be wound about a core into roll form for easy storage, shipping, and use.

In one approach, the polymers for outer patterned backing layer 11 and intermediate layer 12 are coextruded (i.e., extruded together at the same time). Alternatively, each of the layers could be extruded separately and thereafter joined together, for example, by lamination or adhesive bonding. Almost any combination of layers may be coextruded then joined to the remaining layers. The different layers may also be assembled by various sequential or tandem coating methods. Combinations of coating and extrusion are also contemplated. The patterned surface may be formed by embossing techniques utilizing heat and/or pressure. Of course, other techniques are also possible and will be readily thought of by those skilled in the art.

Generally, the materials in adjacent layers are compatible and either adhere together by themselves or be capable of being adhered together so as to provide sufficient interlayer adhesion that the drag reduction article does not delaminate during normal use. A large proportion of acrylic polymer in intermediate layer 12 can provide good adhesion between outer patterned backing layer 11 and adhesive bonding layer 14. Intermediate layer 12 may be provided with a surface treatment, such as etching or corona treatment as described above, to promote good adhesion between intermediate layer 12 and outer patterned backing layer 11, or adhesive bonding layer 14, or both. Alternatively, such surface treatments may be employed to promote good adhesion directly between outer patterned backing layer 11 and adhesive bonding layer 14.

Figure 6:
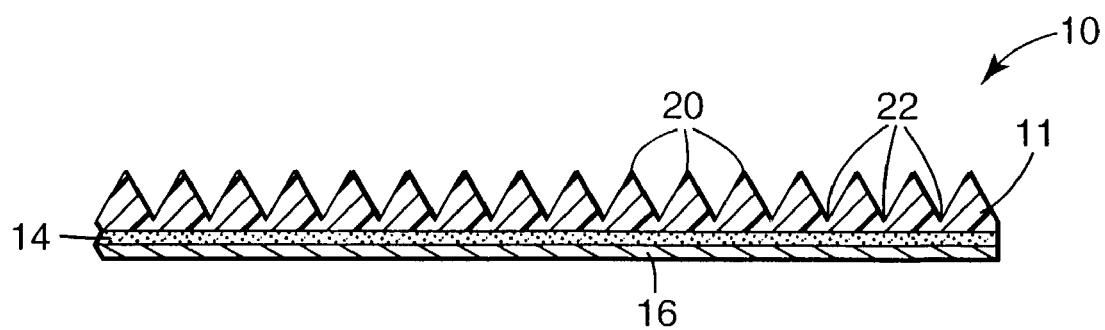
FIG. 6 is sectional view similar to FIG. 2 but showing an alternative embodiment, of the invention.

Adhesive bonding layer 14 is applied to the surface of outer patterned backing layer 11 that is opposite the patterned surface. For example, bonding layer 14 can be coated onto a web comprising outer patterned backing layer 11 that has been previously extruded. A temporary, removable, protective liner 16 may then be laminated to bonding layer 14. Alternatively, bonding layer 14 can be coated onto a protective liner. 16 and transfer laminated to a pre-formed web comprising outer patterned backing layer 11 by passing the pre-formed web and the bonding layer-coated protective liner between rubber rolls, which may be heated if needed. The resulting drag reduction article is shown in FIG. 6. When intermediate layer 12 is employed, adhesive bonding layer is applied, using these same techniques, to the surface of intermediate layer 12 opposite that which is adjacent to outer patterned backing layer 11.

Another useful technique comprises applying a radiation curable composition to a flexible carrier, contacting the radiation curable composition with a master bearing the positive structure of the desired pattern, and radiation curing the composition. The resulting tooling sheet may be removed from the master and subsequently used to impart a pattern to outer backer layer 11 by coating, extruding, or coextruding the materials for layers 11 and 12 onto the tooling sheet. Additional information about such manufacturing techniques can be found in U.S. Pat. No. 4,576,850 (Martens); U.S. Pat. No. 5,183,597 (Lu); and U.S. Pat. No. 5,468,540 (Lu).

Still another approach involves taking a web comprised of outer backing layer 11 and laminating a tooling sheet to layers 11 and 12 using heat and/or pressure in order to impart the pattern of the tooling sheet to the surface of outer backing layer 11.

The use of a tooling sheet can be advantageous in that it also acts as a carrier web to protect outer patterned backing layer 11 through any additional processing operations, such as corona treating, adhesive bonding layer attaching, slitting, or perforating. It may be removed prior to using the drag reduction article, or after application of drag reduction article 10 to a substrate or it can be removed at any time during the manufacture of the drag reduction article.

The drag reduction articles of the invention may be readily applied to a variety of substrates to reduce the drag experienced when that substrate moves through a fluid medium or when a fluid moves past the substrate. The article is positioned on the substrate such that the patterned surface will provide maximum drag reduction. When the patterned surface comprises parallel peaks and valleys, maximum drag reduction is achieved when the peaks and valleys are generally parallel to the fluid flow. The drag reduction articles of the invention employing the bonding layers described herein are expected to possess excellent weather and fluid resistance as disclosed in U.S. Pat. No. 6,475,616 and PCT Publication No. WO 02/070623 and may be easily applied over flat or smooth contoured surfaces, i.e., essentially free of surface protrusions, e.g., raised rivets, such as those typically found on the exterior surface of commercial aircraft. Providing perforations or other discontinuities (e.g., slits) in the drag reduction article can facilitate applying the drag reduction article to a substrate and accommodates the passage of moisture and vapors through the article. A further advantage of the invention is its ease of manufacture and a decreased cost of production due to a reduced number of layers required for its construction. Drag reduction articles of the present invention do not contain a reinforcing layer, such as that described in U.S. Pat. No. 5,848,769. Such materials are said to include thermoplastic polyurethanes and polyvinyl chloride. It has been found that sufficiently conformable drag reduction articles may be provided without employing such a layer. Further, elimination of the reinforcing layer is expected to contribute to improved fluid resistance in the present invention.

In the case of uncured composite articles comprising matrix binder resins (typically, but not limited to, thermosetting matrix binder resins) and fibers, a drag reduction article including outer patterned backing layer 11, and optionally intermediate layer 12, may be co-cured with the uncured composite article to form a finished composite article having a drag reduction article surface thereon. In this embodiment, the uncured composite article serves as the bonding layer 14. Alternatively, a thin layer of adhesive bonding material 14 may be applied to outer patterned backing layer 11, or intermediate layer 12 when it is present, and the drag reduction article is placed over the uncured composite article and then co-cured with the uncured composite article to form a finished composite article having a drag reduction surface thereon. For example, a drag reduction article having a pressure-sensitive adhesive bonding layer on one surface may be placed onto the uncured composite article and then co-cured with the uncured composite article to form a finished composite article having a drag reduction surface thereon. In another example, a drag reduction article of the invention having a curable adhesive layer may be placed onto a cured composite article and the curable adhesive of the drag reduction article is cured. In the co-curing of uncured composite articles and the drag reduction articles described above, hand pressure is used to bring the drag reduction articles in contact with the uncured composite articles followed by debulking (as described in Engineered Materials Handbook, Volume 1: Composites) to remove any entrapped air. In these ways, the drag reduction article of the invention can be used to provide drag reduction surfaces on composite articles.

In the practice of this invention, a drag reduction article of the invention may be used in the initial production of a substrate having a drag reduction surface, for example, a composite article, or used in the field to provide such substrates in which case the adhesive bonding layer, if curable, may be cured at ambient temperature or may require elevated temperature. The required elevated temperature may be provided by known means, such as IR lamps, heat guns, portable heaters, and the like.

In general, the drag reduction article of the invention can be used on any substrate to which the adhesive bonding layer will bond thereto. Examples of such substrates include painted surfaces, primed surfaces, metallic surfaces, ceramics, cured and un-cured composite surfaces, fluorinated polymer surfaces, plated surfaces, galvanized surfaces, and the like.

The invention will be more fully appreciated with reference to the following non-limiting example. Various abbreviations and tradenames employed in the examples are defined according to the table below.

ABBREVIATIONS AND TRADENAMES

| Outer Patterned Layer and Intermediate Layer | | |
|---|---|---|
| Abbreviation | Description | Source |
| PVDF | Polyvinylidene fluoride, nominal MFI = 120 g/10 minutes* | Solef ™ Grade 1006 from Solvay Plastics, Houston, TX |
| PMMA | Poly(methylmethacrylate), melt index 27 | CP-41 from ICI Acrylics Inc., St. Louis, MO |

*All melt flow indices (MFI) are measured at 230° C. and 5 kg, according to ASTM D-1238.

Preparation of a Carrier Web/Tooling Sheet

A patterned tooling sheet was prepared from the following materials:

A 125 micrometer (0.005 inches) thick polyester film was coated with a UV curable acrylic prepolymer solution of the following ingredients to provide a coating weight of approximately 34 g/m$^2$ (3.2 gm/ft$^2$):

a. 59.5% by weight bisphenol-A epoxy diacrylate (Photomer™ 3016 from Henkel Corp., Ambler, Pa.);
  b. 39.5% by weight phenoxyethyl acrylate (Photomer™ 4035 from Henkel Corp.); and
  c. 1.0% by weight 2-hydroxy-2-methyl-1-phenylpropan-1-one (Darocur™ 1173 from Ciba-Geigy Corp.

The film with the solution thereon was passed through a squeeze roll nip with the solution contacting a cylinder engraved with a grooved pattern. While in contact with the engraved cylinder, the solution was exposed to a UV light source (medium pressure mercury lamp, 400 watts, from Actek International, Plainsville, Ill.), for approximately 0.1–1.0 second to cure the solution. The cured material was stripped from the cylinder and used as a carrier web/tooling sheet to impart the grooved pattern to the drag reduction article surface.

The pattern on the cured material surface had a cross-section similar to that of FIG. 2 with a 62.5 micrometers (2.5 mils) peak height, a 62.5 micrometers (2.5 mils) peak to peak spacing, and an included angle between adjacent peaks of 53°.

The sample was then examined under a 100 power microscope to determine the sharpness of the profile produced. The sample had sharp peaks and valleys.

EXAMPLE

A drag reduction article having a backing with a drag reduction pattern on one side and an adhesive bonding layer on the other side was prepared as follows:

A blend of PVDF:PMMA/90:10 (weight ratio) was fed by a single screw extruder having a length:diameter ratio of 24:1 to a five-layer feedblock which in turn fed into a single layer extrusion die having a 914 mm×1.02 mm (36×0.04 inches) opening. The extruder had multiple heating zones with the last zone set between 204.5° C.–215.5° C. (400–420° F.). The coextrusion die temperature was set at 215.5° C. (420° F.).

The extruder was plumbed to the die such that blend exited the die and was placed directly in contact with the carrier web/tooling sheet described above.

The carrier web was fed through a nip consisting of a polished chrome roll and a matte-finished ground silicone rubber roll. The temperature of both nip rolls was maintained at 88° C. (190° F.).

The hot extrudate was cast onto the carrier web/tooling sheet and immediately nipped between nip rolls at a roll pressure of 21 kg/cm (118 lbs per lineal inch). Surface speed of the rolls was 8.5 m (28 ft)/min. The resulting film had a total thickness, as measured from the top of the peaks to the opposite side of the backing layer of 114.3 micrometers (0.0045 inches) and exactly replicated the pattern of the carrier web/tooling sheet.

The backing film was then corona treated on its unpatterned side after which it was laminated at room temperature to 3M™ 468 Laminating Adhesive Tape (an acrylic adhesive on a silicone release liner, available from 3M Company). The adhesive thickness was approximately 125 micrometers (0.005 inches). After removal of the carrier web/tooling sheet and the protective liner, samples of the drag reduction article were applied to 1) flat and 2) smooth contoured substrates. The application process was easily accomplished and the samples readily conformed to the substrate surfaces.

The drag reduction article was then examined under a 100 power microscope to determine the sharpness of the patterned profile produced. The patterned surface of the backing possessed sharp peaks and valleys.

Various modifications are possible within the scope of the foregoing specification and drawings without departing from the invention which is defined by the accompanying claims.

What is claimed is:

1. A drag reduction article comprising:
   (a) a fluoropolymer backing layer having an outer, exposed patterned surface that reduces the drag caused by a fluid flowing over the surface, wherein the backing layer comprises a blend of first and second polymers, the first polymer comprising at least 70% by weight of a fluoropolymer, and the second polymer comprising as much as 30% by weight of an acrylic polymer;
   (b) a pressure-sensitive adhesive bonding layer adjacent to the backing layer; and
   (c) an intermediate layer between the backing and adhesive bonding layer, wherein the intermediate layer comprises a blend of first and second polymers, the first polymer comprising as much as 30% by weight of a fluoropolymer, and the second polymer comprising at least 70% by weight of an acrylic polymer, and wherein the article is free of a reinforcing layer.

2. A drag reduction article comprising:
   (a) an outer layer having an exposed, patterned surface that reduces the drag caused by a fluid flowing over the surface, wherein:
      (1) the outer layer comprises a blend of first and second polymers, the first polymer comprising polymerized units of vinylidene fluoride, and the second polymer comprising the polymerization product of a monomer selected from the group consisting of methyl methacrylate, ethyl methacrylate, butyl methacrylate, and combinations thereof; and
      (2) the exposed, patterned surface is a series of essentially parallel peaks separated by a series of essentially parallel valleys;
   (b) an adhesive bonding layer for bonding the drag reduction article to a surface; and
   (c) an intermediate layer between the outer layer and the adhesive bonding layer; wherein:
      the intermediate layer comprises:
         a blend of first and second polymers, the first polymer comprising polymerized units of vinylidene fluoride, and the second polymer comprising the polymerization product of a monomer selected from the group consisting of methyl methacrylate, ethyl methacrylate, butyl methacrylate, and combinations thereof; and
      wherein the article is free of a reinforcing layer.

3. A drag reduction article according to claim 2 wherein the polymer that comprises polymerized units of vinylidene fluoride is independently selected for both the outer layer and the intermediate layer from the group consisting of: (1) polymerized units of vinylidene fluoride, (2) copolymers derived from polymerized units of vinylidene fluoride and a monomer selected from the group consisting of ethylene, hexafluoropropylene, tetrafluoroethylene, and combinations thereof, and (3) combinations of (1) and (2).

4. A drag reduction article according to claim 3 wherein the second polymer is poly(methyl methacrylate).

5. An article that is capable of reducing the drag caused by a fluid flowing over a substrate to which the article is attached, the drag reduction article comprising:
   (a) an outer layer having an exposed, patterned surface that reduces the drag caused by the fluid flowing over the surface, wherein:
      (1) the outer layer comprises a blend of first and second polymers, the first polymer comprising at least 70% by weight of a polymer that is selected from the group consisting of: (A) poly(vinylidene fluoride), (B) copolymers derived from polymerized units of vinylidene fluoride and a monomer selected from the group consisting of ethylene, hexafluoropropylene, tetrafluoroethylene, and combinations thereof, and (C) combinations of (A) and (B), and the second polymer comprising as much as 30% by weight poly(methyl methacrylate); and
      (2) the exposed, patterned surface is a series of essentially parallel peaks separated by a series of essentially parallel valleys;
   (b) an adhesive bonding layer for bonding the drag reduction article to the substrate; and
   (c) an intermediate layer between the outer layer and the adhesive bonding layer, wherein the intermediate layer comprises a blend of first and second polymers, the first polymer comprising as much as 30% by weight of a polymer that is selected from the group consisting of: (1) poly(vinylidene fluoride), (2) copolymers derived from polymerized units of vinylidene fluoride and a monomer selected from the group consisting of ethylene, hexafluoropropylene, tetrafluoroethylene, and combinations thereof, and (3) combinations of (1) and (2), and the second polymer comprising at least 70% by weight poly(methyl methacrylate); wherein the article is free of a reinforcing layer.

6. An assembly comprising a drag reduction article according to claim 5 that has been adhesively bonded to the surface of an airplane so as to reduce the drag caused by a fluid flowing over that surface.

* * * * *

UNITED STATES PATENT AND TRADEMARK OFFICE
CERTIFICATE OF CORRECTION

PATENT NO. : 7,070,850 B2  
APPLICATION NO. : 10/335496  
DATED : July 4, 2006  
INVENTOR(S) : Timothy M. Dietz It is certified that error appears in the above-identified patent and that said Letters Patent is hereby corrected as shown below:

Column 6,  
Line 55, delete "shown-in" and insert in place thereof -- shown in --.

Column 9,  
Line 12, delete "norbomyl" and insert in place thereof -- norbornyl --.

Column 15,  
Line 26, delete "diarnine" and insert in place thereof -- diamine --.

Column 16,  
Line 34, delete "Acrvlate" and insert in place thereof -- Acrylate --.

Signed and Sealed this

Tenth Day of April, 2007

JON W. DUDAS  
*Director of the United States Patent and Trademark Office*